April 20, 1954     R. S. MARSDEN, JR     2,676,196
ELECTRICAL TRANSDUCING ELEMENT
Filed Feb. 27, 1953
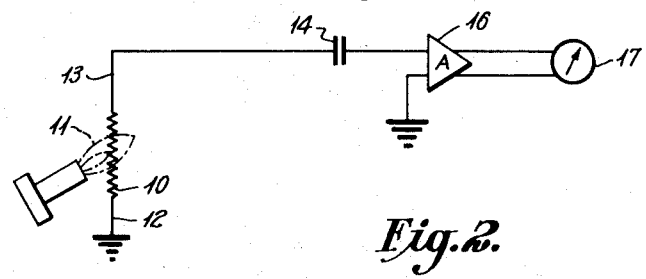
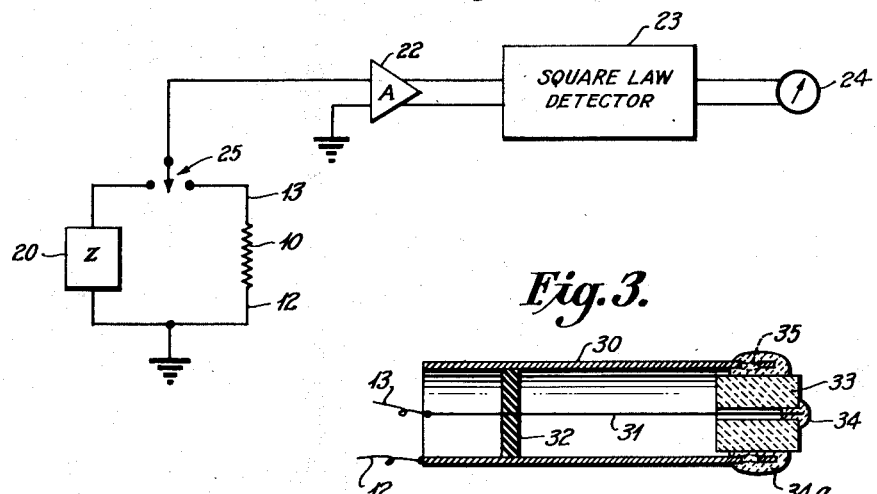
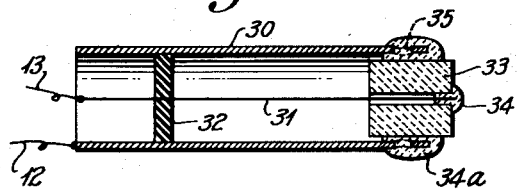
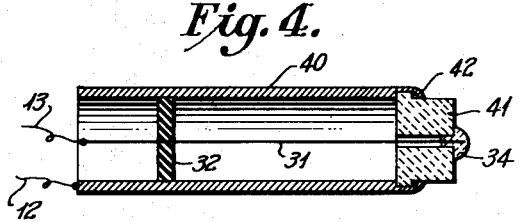
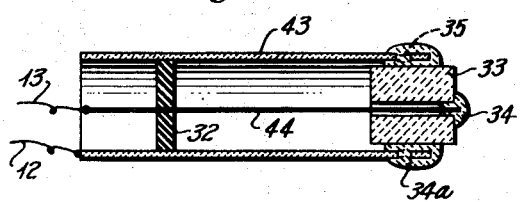
INVENTOR.
R. S. Marsden, Jr.
BY Hudson & Young
ATTORNEYS Patented Apr. 20, 1954

2,676,196

UNITED STATES PATENT OFFICE 2,676,196

ELECTRICAL TRANSDUCING ELEMENT

Ross S. Marsden, Jr., Bartlesville, Okla., assignor to Phillips Petroleum Company, a corporation of Delaware Application February 27, 1953, Serial No. 339,424

17 Claims. (Cl. 136—5)

1

This invention relates to improved electrical transducing elements. In another aspect it relates to methods of constructing electrical transducing elements which are adapted for use in regions of high temperature.

An improved form of flame detector recently has been developed which is based upon the discovery that a fluctuating electrical potential is developed across opposite terminals of certain resistance elements disposed in the region of a flame. Any electrically conductive element normally has a substantially constant distribution of potential throughout. However, if charged particles, for example, the ions produced by the reaction of a flame, impinge upon the surface of such an element the constant potential distribution is disrupted which results in small currents flowing in the element until all of the points therein are once again at the same potential. During the time current is flowing, either one of the attached electrodes exhibits a potential variation with respect to the other electrode which depends upon the magnitude of charge on the particles striking the element, the number striking the element and the geometric relation of the two electrodes. This potential variation, after amplification, can be measured to provide an indication of flame impinging upon the element, and such phenomenon is so utilized as the basis for providing a flame detection system in accordance with the copending application of D. R. deBoisblanc, Serial No. 220,113, filed April 9, 1951.

It further has been discovered that certain ceramic refractory materials can be employed to advantage as the sensing element in such a flame detecting system. For the most part, these ceramic materials exhibit high electrical resistance and generally are considered non-conductors. However, when exposed to regions of high temperatures their resistance is lowered considerably, that is, they exhibit a negative coefficient of thermal resistivity. In order to provide a satisfactory flame sensing element, it is essential that the resistance of the element remain relatively high under the conditions of operation. Unfortunately, those ceramics which exhibit such high resistivity at high operating temperatures require higher baking temperatures than the metallic electrodes to which they are attached can withstand without melting or excessive corrosion. Some difficulty has thus been experienced in fabricating suitable ceramic detecting elements for use in the measurement of high temperature flames.

2

An improved temperature measuring system also has been developed recently which is based upon the principle that there exists within any electrical resistance element a random statistical movement of electrical charges. The statistical movement of electrical charges is referred to as "thermal noise" because minute voltage fluctuations measured across the end terminals of a resistance element are proportional to the absolute temperature of the element. The relationship can be expressed mathematically by the Nyquist formula:

$$\overline{E^2} = 4kR_e(Z)T\Delta f$$

where $\overline{E^2}$ equals the mean-square voltage fluctuations across the resistance element, $\Delta f$ is the frequency band over which the voltage fluctuations are measured, $k$ is Boltzmann's gas constant, $R_e(Z)$ is the real part of the complex impedance of the element, and $T$ is the absolute temperature of the element. It is to be understood that such thermal noise voltages are of considerably less magnitude than the previously mentioned flame signal and apparently are in no way connected therewith, but rather are dependent upon temperature alone. By employing this thermal noise relationship the temperature of a first given resistance element can be obtained by comparing the voltage fluctuations generated across the first element with the voltage fluctuations generated across a second element at a known temperature. A system for measuring temperature in accordance with this principle is described in the copending application of D. R. deBoisblanc and R. S. Marsden, Jr., Serial No. 220,115, filed April 9, 1951.

In operating this thermal noise thermometer satisfactory results have been obtained with detecting elements having resistances of approximately 1000 to 10,000 ohms. However, considerable difficulty has been encountered in constructing resistance elements for use in such a thermal noise thermometer, particularly for use at temperatures above approximately 1400° C. Metallic resistances generally are not satisfactory at these high temperatures because metals capable of withstanding high temperatures are relatively good conductors which necessitates the elements being constructed of very small cross-section and relatively great length in order to afford the desired ohmic resistance. Many of these difficulties have been overcome, however, by constructing the detecting elements of suitable ceramics which have the desired ohmic resistance at the temperatures under consideration. Unfortunately, substantially the same problems are encountered in constructing such temperature sensing elements as previously mentioned in conjunction with the flame detecting elements.

In accordance with the present invention, it has been discovered that suitable electrical transducing elements for use in high temperature regions can be prepared by bonding metallic electrodes to a high baking ceramic material by the use of a second low baking ceramic. These low baking ceramic materials, while not affording the resistance desired for high temperature measurements, are valuable as a bonding material to attach the metallic electrodes to the high resistance ceramic. Accordingly, this invention is directed primarily toward providing improved electrical transducing elements for use in both flame detectors and thermal noise thermometers.

It is an object of the invention to provide electrical transducing elements capable of withstanding extremely high temperatures.

Another object is to provide a method of constructing ceramic electrical transducing elements for use in regions of high temperature.

A further object is to provide electrical transducing elements which are rugged in construction, economical to manufacture, and which possess the desired electrical properties needed for satisfactory operation in regions of high temperature.

Various other objects, advantages, and features of this invention should become apparent from the following detailed description taken in conjunction with the accompanying drawing in which:

Figure 1 is a schematic view of flame detecting apparatus employing a transducing element constructed in accordance with this invention as the sensing element;

Figure 2 is a schematic view of thermal noise temperature measuring apparatus employing a transducing element constructed in accordance with this invention as the sensing element; and Figures 3, 4, and 5 illustrate various forms of electrical transducing elements constructed in accordance with this invention.

Referring now to the drawing in detail and to Figure 1 in particular, there is shown a ceramic transducing element 10 which is disposed in the region of a flame 11, the presence of which is to be detected. One terminal of element 10 is grounded by a lead 12 and the second terminal thereof is connected by a lead 13 to one terminal of a condenser 14. The second terminal of condenser 14 is connected to one input terminal of an alternating current amplifier 16, the second input terminal of which is grounded. The output terminals of amplifier 16 are connected to a suitable indicating meter 17 which can be in the form of a rectifier and current meter, for example. The presence of flame impinging upon element 10 results in fluctuating voltages being developed across the two end terminals thereof. This fluctuating voltage is amplified and indicated on meter 17 in a manner which is more fully described in the above mentioned application, Serial No. 220,113.

In Figure 2 there is illustrated a simplified embodiment of the above mentioned thermal noise thermometer. A variable impedance element 20 and an electrical transducing element 10 are connected alternately in circuit with an amplifier 22, a square law detector 23, and a meter 24 by means of a switch 25. Resistance element 20 is maintained at a known reference temperature whereas element 10 is positioned in the region of the unknown temperature being measured. In operating this thermometer the impedances of the two elements 10 and 20 first are equalized over a predetermined frequency range by suitable means, not shown. This equalization can be accomplished by applying an alternating voltage of variable frequency first across one element and then the other. The corresponding voltage drops across each element are measured and the impedance of element 20 is adjusted until the impedances of the two elements are equalized over a preselected frequency range. Thermal noise voltage fluctuations generated across each of the elements then are read on meter 24, which due to the presence of square law detector 23, are proportional to the mean-square voltage fluctuations generated across each element. The ratio of these readings is directly proportional to the ratio of temperatures of the elements; and, accordingly, the temperature of element 10 can readily be calculated.

The transducing elements illustrated in Figures 3, 4, and 5 are constructed in accordance with the present invention for use as element 10 in either of the circuits illustrated in Figures 1 or 2.

Referring now to Figure 3, the electrical transducing element is shown as comprising a cylindrically shaped metallic casing 30 having a metallic electrode 31 disposed axially therein and electrically insulated from casing 30 by insulating supports such as 32. Casing 30 and electrode 31 are constructed of metals having high melting points, for example: platinum, tungsten, or iridium. A hollow cylindrical pre-fired high baking ceramic plug 33 is positioned within one end of casing 30. Electrode 31 extends through the center of plug 33 and is attached thereto by a quantity of low baking ceramic material 34 which is molded about plug 33 and sintered. Plug 33 is likewise attached to casing 30 by a quantity of like ceramic material 34a which is molded about the end portion of casing 30 and plug 33. A plurality of holes 35 are drilled near the end of casing 30 to facilitate attachment of material 34a to casing 30. Electrical leads 12 and 13 are secured to casing 30 and electrode 31, respectively, to connect the transducing element in the electrical circuitry of either Figure 1 or Figure 2.

In Figure 4 there is shown a modified form of the transducing element of Figure 3. In this embodiment casing 30 is replaced by a metallic casing 40 and plug 33 is replaced by a flanged hollow ceramic plug 41. The end 42 of casing 40 is bent around the flanged portion of plug 41 so as to form a rigid connection therewith without the use of a binding material. Otherwise, the construction of the element shown in Figure 4 is identical to that of the element shown in Figure 3.

Figure 5 illustrates a third form of transducing element which is identical to that shown in Figure 3 except that metallic casing 30 is replaced by a casing 43 which is constructed of a suitable ceramic material that is a relatively good electrical conductor at elevated temperatures. Electrode 31 is replaced by a rod 44 of like conductive ceramic. Silicon carbide can be used to advantage in this respect. Other ceramics which become relatively good conductors include titanium carbide, zirconium carbide, columbium carbide, tantalum carbide, tungsten carbide, and hafnium carbide. Any of these materials can be employed to advantage in the construction of casing 43 and rod 44.

As employed herein, the phase "baking temperature" refers to the temperature to which the moulded ceramic materials must be heated to obtain appreciable strength. The phrases "firing temperature" and "maturing temperature" are often employed in the art in like manner. The phrase "low baking" is employed herein to designate baking temperatures below approximately 1000° C. and the phrase "high baking" is employed to designate baking temperatures above approximately 1400° C.

As an example of the construction of the transducing element illustrated in Figure 3, casing 30 and electrode 31 are formed of tungsten. Plug 33 is formed of a ceramic comprising 99.3% by weight aluminum oxide and 0.7% silicon dioxide and having a baking temperature of approximately 1790° C. Bonding ceramics 34 and 34a are formed of the same material as plug 33 to which has been added sufficient clay to reduce the baking temperature of the resulting mixture to approximately 1000° C. This mixture is powdered and sufficient water is added to make a workable cement which is moulded about plug 34, casing 30, and electrode 31 as illustrated. The entire assembly is then heated to at least 1000° C. to bake ceramics 34 and 34a.

As a second example of the construction of the transducing element illustrated in Figure 3, casing 30 and electrode 31 are formed of platinum. Plug 33 is formed of a ceramic comprising 86.0% by weight aluminum oxide, 13.0% silicon dioxide, and the remainder being mainly titanium dioxide, ferric oxide, and sodium oxide, and having a baking temperature of approximately 1400° C. Bonding ceramics 34 and 34a are formed of the same material as plug 33 to which has been added sufficient clay to reduce the baking temperature of the resulting mixture to approximately 700° C. The actual mode of construction is the same as above mentioned.

In addition to the above examples, various other ceramics can be used in constructing the transducing elements of this invention. The high baking ceramics for plugs 33 and 41 can be formed of any such materials which are capable of withstanding the high temperatures under consideration and which at the same time afford the desired ohmic resistance. Ceramics comprising generally from 86.0% to 99.5% by weight aluminum oxide, 0.5 to 14.0% silicon carbide, the remainder, if any, being mainly titanium dioxide, ferric oxide and sodium oxide, having a specific gravity of from 3.8 to 4.2, and having a baking temperature above 1400° C. can be employed to advantage. Still another suitable ceramic comprises, for example, approximately 97.0% by weight magnesium oxide, 1.5% calcium oxide, and 1.5% silicon dioxide. The low baking bonding ceramics 34 and 34a can be prepared by adding sufficient clay to any of the described high baking ceramics to reduce the baking temperature to a desired value. Also, such bonding materials can be purchased commercially as refractory cements. Insulators 32 can be formed of any known high resistance material, aluminum oxide, for example, the material selected depending on the highest temperatures expected at that point, and different materials can be used at different points if desired when there are a plurality of such insulators.

While this invention has been described in conjunction with present preferred embodiments thereof, it should be apparent that the invention is not limited thereto.

What is claimed is:
1. An electrical transducing element comprising, in combination, a pair of opposing spaced electrodes, and a ceramic resistance element disposed between said spaced electrodes, said element being secured to said electrodes by a quantity of electrically conductive ceramic material, said ceramic resistance element being constructed of a material having a baking temperature above 1400° C. and said second-mentioned ceramic material having a baking temperature below 1000° C.

2. The combination in accordance with claim 1 wherein said pair of opposing spaced electrodes are constructed of metal having a melting temperature above 1000° C.

3. The combination in accordance with claim 1 wherein said pair of opposing spaced electrodes are constructed of electrically conductive ceramic material.

4. The combination in accordance with claim 3 wherein said opposing electrodes are constructed of electrically conductive ceramics selected from the group consisting of silicon carbide, titanium carbide, zirconium carbide, columbium carbide, tantalum carbide, tungsten carbide, and hafnium carbide.

5. The combination in accordance with claim 1 wherein said ceramic resistance element comprises from 86.0 to 99.5 per cent by weight aluminum oxide and 0.5 to 14.0 per cent silicon dioxide, the remainder being mainly titanium oxide, ferric oxide and sodium oxide, said element having a specific gravity of from 3.8 to 4.2; and said second-mentioned ceramic material comprises said first-mentioned ceramic material to which has been added sufficient clay to reduce the baking temperature thereof below 1000° C.

6. The combination in accordance with claim 5 wherein said ceramic resistance element comprises 86.0 per cent by weight alumnium oxide and 13.0 per cent silicon dioxide, the remainder being mainly titanium dioxide, ferric oxide, and sodium oxide; and said second-mentioned ceramic material comprises said first-mentioned ceramic material to which has been added sufficient clay to reduce the baking temperature thereof to approximately 700° C.

7. The combination in accordance with claim 1 wherein said ceramic resistance element comprises 99.3 per cent by weight aluminum oxide and 0.7 per cent silicon dioxide and has a baking temperature of approximately 1790° C.; and said second-mentioned ceramic material comprises said first-mentioned ceramic material to which has been added sufficient clay to reduce the baking temperature thereof below 1000° C.

8. The combination in accordance with claim 1 wherein said ceramic resistance element comprises 97.0 per cent by weight magnesium oxide, 1.5 per cent calcium oxide and 1.5 per cent silicon dioxide; and said second-mentioned ceramic material comprises said first-mentioned ceramic material to which has been added sufficient clay to reduce the baking temperature thereof below 1000° C.

9. An electrical transducing element, comprising, in combination, a hollow cylindrical metallic electrode, a second elongated electrode positioned within and electrically insulated from said first electrode, a hollow cylindrical ceramic resistance element positioned adjacent one end of said first electrode, one end of said second electrode extending through the hollow portion of said resistance element, and a quantity of electrically conductive ceramic material securing said first and second electrodes to said resistance element, said ceramic resistance element having a baking temperature above 1400° C., and said second-mentioned ceramic material having a baking temperature below 1000° C.

10. The combination in accordance with claim 9 wherein said second electrode is constructed of a metal having a melting temperature above 1000° C. and said first electrode has a melting temperature above 1000° C.

11. The combination in accordance with claim 10 wherein said ceramic resistance element comprises from 86.0 to 99.5 per cent by weight aluminum oxide and 0.5 to 14.0 per cent silicon dioxide, the remainder being mainly titanium oxide, ferric oxide and sodium oxide, said element having a specific gravity of from 3.8 to 4.2; and said second-mentioned ceramic material comprises said first-mentioned ceramic material to which has been added sufficient clay to reduce the baking temperature thereof below 1000° C.

12. An electrical transducing element comprising, in comibnation, a hollow cylindrical metallic electrode, a second elongated electrode positioned within and electrically insulated from said first electrode, a hollow cylindrical ceramic resistance element disposed within said first electrode and secured to one end thereof, one end of said second electrode extending through the hollow portion of said resistance element, and a quantity of electrically conductive ceramic material securing said second electrode to said resistance element, said ceramic resistance element having a baking temperature above 1400° C., and said second-mentioned ceramic material having a baking temperature below 1000° C.

13. The combination in accordance with claim 12 wherein said first and second elements are constructed of a material selected from the group consisting of silicon carbide, titanium carbide, zirconium carbide, columbium carbide, tantalum carbide, tungsten carbide, and hafnium carbide.

14. The combination in accordance with claim 13 wherein said ceramic resistance element comprises from 86.0 to 99.5 per cent by weight aluminum oxide and 0.5 to 14.0 per cent silicon dioxide, the remainder being mainly titanium oxide, ferric oxide and sodium oxide, said element having a specific gravity of from 3.8 to 4.2; and said second-mentioned ceramic material comprises said first-mentioned ceramic material to which has been added sufficient clay to reduce the baking temperature thereof below 1000° C.

15. An electrical transducing element comprising, in combination, a hollow cylindrical electrode constructed of a conductive ceramic material, a second elongated electrode positioned within and electrically insulated from said first electrode, a hollow cylindrical ceramic resistance element positioned adjacent one end of said first electrode, one end of said second electrode extending through the hollow portion of said resistance element, and a quantity of electrically conductive ceramic material securing said first and second electrodes to said resistance element, said ceramic resistance element having a baking temperature above 1400° C., and said second-mentioned ceramic material having a baking temperature below 1000° C.

16. The combination in accordance with claim 15 wherein said first and second elements are constructed of a material selected from the group consisting of silicon carbide, titanium carbide, zirconium carbide, columbium carbide, tantalum carbide, tungsten carbide, and hafnium carbide.

17. The combination in accordance with claim 16 wherein said ceramic resistance element comprises from 86.0 to 99.5 per cent by weight aluminum oxide, and 0.5 to 14.0 per cent silicon dioxide, the remainder being mainly titanium oxide, ferric oxide and sodium oxide, said element having a specific gravity of from 3.8 to 4.2; and said second-mentioned ceramic material comprises said first-mentioned ceramic material to which has been added sufficient clay to reduce the baking temperature thereof below 1000° C.

No references cited.